United States Patent [19]
Matly et al.

[11] Patent Number: 5,209,122
[45] Date of Patent: May 11, 1993

[54] PRESSURER SENSOR AND METHOD FOR ASSEMBLY OF SAME

[75] Inventors: John M. Matly; Janet S. Dawson, both of Kokomo, Ind.

[73] Assignee: Delco Electronics Corporation, Kokomo, Ind.

[21] Appl. No.: 795,866

[22] Filed: Nov. 20, 1991

[51] Int. Cl.⁵ .................... G01L 7/08; G01L 9/06; H01C 17/24
[52] U.S. Cl. .................... 73/727; 29/621.1; 73/708; 73/721; 73/756; 338/4
[58] Field of Search .................. 73/727, 721, 720, 726, 73/706, 708, 756, DIG. 4; 338/4, 3; 29/621.1

[56] References Cited
U.S. PATENT DOCUMENTS

| | | | |
|---|---|---|---|
| 4,295,117 | 10/1981 | Lake et al. | 338/4 |
| 4,481,497 | 11/1984 | Kurtz et al. | 73/756 |
| 4,516,430 | 5/1985 | Kurtz et al. | 73/727 |
| 4,756,193 | 7/1988 | Luettgen | 73/756 |
| 4,850,227 | 7/1989 | Luettgen et al. | 73/708 |
| 5,107,710 | 4/1992 | Huck et al. | 73/708 |
| 5,142,915 | 9/1992 | Bergstrom | 73/727 |

Primary Examiner—Donald O. Woodiel
Attorney, Agent, or Firm—Robert J. Wallace

[57] ABSTRACT

A pressure sensor assembly is provided containing a substrate having signal conditioning circuitry disposed on both surfaces of the substrate, with the critical pressure sensing element disposed on one surface of the substrate and the laser trimmable resistors disposed on the other surface of the substrate. The preferred ported housing of this invention seals the one side of the substrate containing the pressure sensing element thereby forming a pressurizable chamber, while allowing the signal conditioning circuitry and resistors on the other surface exposed for calibration by laser trimming of the resistors. This eliminates the requirement for a separate housing for the critical pressure sensing element. In addition, when the preferred ported housing is mounted to the pressure sensing side of the substrate for formation of the sealed pressure chamber, the through-holes which electrically interconnect the signal processing circuitry on both sides of the substrate are also concurrently sealed.

9 Claims, 3 Drawing Sheets

PRESSURER SENSOR AND METHOD FOR ASSEMBLY OF SAME

This invention generally relates to sensors of the pressure sensing type. More particularly, this invention relates to the packaging and assembly of such a pressure sensor, wherein the sensor employs a double sided substrate having thick film circuitry on both surfaces, as well as an enclosed pressure sensitive integrated circuit on one of those surfaces, yet exposed signal conditioning circuitry on the other surface allowing for calibration of that signal conditioning circuitry by laser trimming means.

BACKGROUND OF THE INVENTION

Pressure sensors are used in automotive vehicles for a variety of purposes, such as for sensing the vacuum pressure at the intake manifold of a vehicle's engine, as well as for other applications. Generally, such pressure sensors contain a pressure sensitive element. A common type of pressure sensitive element includes a piezoresistive silicon element which is integrated with appropriate adjusting circuitry in a monolithic silicon integrated circuit. The piezoresistive silicon element typically contains a diaphragm and piezoresistive strain sensors disposed on the diaphragm, which are connected to the adjusting circuitry for measuring the deflection of the diaphragm due to pressure changes.

Often, the pressure sensor requires calibration to compensate for the variations that tend to occur during manufacturing between individual pressure sensing elements and signal conditioning circuitry during manufacturing. To provide for this compensation, it is advantageous to include either separately or as part of the integrated circuit, a conditioning network that permits customized adjustment of the output parameters for the individual pressure sensor. This conditioning network typically is a network of resistors, of which some may be selectively modified or removed from the integrated circuit by laser trimming the area of the resistors or alternatively by opening fusible links in the network. However, in order to calibrate these pressure sensors, the critical pressure sensing element must first be enclosed within a pressurizable chamber.

In the past, many different types of pressure sensor assemblies have been disclosed. Often, the pressure sensing element has been disposed within a separate container for pressurization by means of a port, such as disclosed in U.S. Pat. No. 4,295,117 to Lake et al. The separate container allows the pressure sensing element to be appropriately pressurized while the signal conditioning circuitry remains exposed, thereby facilitating the laser trimming of the exposed circuitry during calibration. An illustrative example of this type of prior art pressure sensor assembly is cross-sectionally illustrated in FIG. 1. (The size of the components shown in FIGS. 1 through 3 are exaggerated for purposes of description.) The container 10 housing the pressure sensing integrated circuit is located adjacent to, but separate from, the substrate lo having the associated signal conditioning circuitry. The container 10 is required so that the pressure sensing element can be pressurized. Both the container 10 and substrate 16 are glued to a backplate 14, therefore leaving only one side of the substrate 16 available for population by the signal conditioning circuitry. This is an inefficient use of substrate space, and therefore unduly increasing the size of the assembly. During calibration of this type of sensor, pressure is applied to the pressure sensing element within the container 10 through a port 12. A laser is then able to access, from above, and trim the resistor 20 within the signal conditioning circuitry, before a cover 18 is attached.

This prior art approach of FIG. 1 has been satisfactory, although there are shortcomings. The separate container 10 housing the sensing element undesirably increases the number of components within the assembly. The use of a separate container 10 also requires that additional interface joints be formed within the assembly which increases the number of processing steps, thereby possibly decreasing product reliability. Also, as stated previously, by utilizing only a single side of the substrate 16 for the signal conditioning circuitry, the available area of the substrate is not efficiently maximized.

An alternative prior art approach is cross-sectionally shown in FIG. 2. In this configuration, the critical pressure sensing element 10a is attached to a substrate 16 having the associated signal conditioning circuitry also disposed thereon. The substrate 16 is attached to a backplate 14. The pressure sensing element 10a is not contained within a separate container. Rather, pressurization of only the backside of the pressure sensing element 10a is achieved by means of the port 12. This embodiment thus mandates that backside sensing of pressure changes are needed for calibration of a resistor 20 within the signal processing circuitry. After laser trimming, a cover 18 is appropriately attached to seal and protect the components.

This second approach is problematic in that, again, only a single side of the substrate 16 can be populated with signal conditioning circuitry, since the second side is necessarily sealed by the backplate 14 for pressurization of the pressure sensing element 10a through the port 12 during calibration. Therefore, the second side cannot be exposed to the laser trimming operations, leaving only the topside available for deposition of the signal conditioning circuitry. In addition, backside sensing technology is required.

Still another illustrative prior art approach is cross-sectionally shown in FIG. 3. Here, the substrate 16 is suspended within a housing 18, therefore permitting both sides of the substrate 16 to be populated signal conditioning circuitry. However, in order to calibrate the resistors 20a and 20b of the signal conditioning circuitry disposed on both sides of the substrate 16 by laser trimming, the resistors 20a and 20b must be exposed. This, therefore, requires that the pressure sensing integrated circuit be enclosed within its own container 10 and pressurized by means of the port 12, since the sealing cover 18 is not attached until after the laser trimming operations during calibration. Although this approach allows both sides of the substrate 16 to be populated by signal conditioning circuitry, the design is still less than ideal since the pressure sensing element requires a separate, pressurizable container 10. In addition, a design such as this would most probably include electrically conductive through-holes for electrical interconnection of the two sides of signal conditioning circuitry. For calibration, these through-holes would also require sealing unless the pressure sensing integrated circuit was sealed in its own container, as shown.

Lastly, U.S. Pat. Nos. 4,756,193 and 4,859,227 to Luettgen and Luettgen et al., respectively, have offered an alternative approach to housing the pressure sensing element within a separate container. Both Luettgen patents leave the pressure sensing chip in an open chamber and then enclose it by means of a flange on the pressure application nozzle. Therefore, when the chamber requires pressurization, such as for the calibration operation, the pressure sensing element is sealed by the flange of the pressure application nozzle. This has been a satisfactory approach; however, this design utilizes only a single side of the device for disposition of the signal conditioning circuitry.

Therefore, it would be most advantageous to provide a pressure sensor assembly which maximizes the efficiency of the design by employing a double sided substrate for population by the signal conditioning circuitry, and by eliminating the previous requirement for separately containing the pressure sensitive element. In addition, such a pressure sensor assembly should facilitate the calibration of the signal conditioning circuitry of the pressure sensing element by laser trimming operations. Lastly, it would be desirable if such a pressure sensor was amenable for manufacturing by automotive production techniques for use in automotive applications.

SUMMARY OF THE INVENTION

It is an object of the present invention to provide a pressure sensor, and a method for its assembly, which utilizes two surfaces of a substrate for population by the critical pressure sensing component and the associated signal conditioning circuitry, thereby maximizing the efficiency of the sensor design by providing a compact assembly.

It is a further object of the present invention to provide such a pressure sensor assembly wherein the pressure sensing element is attached to one surface of the substrate, that surface being appropriately sealed and pressurized, yet the signal conditioning circuitry including the trimmable resistors, remains accessible for laser trimming during calibration, prior to the final sealing of the pressure sensor assembly.

It is still a further object of this invention that the method for assembly of this invention concurrently mounts the substrate to the housing and seals the through-holes which provide electrical interconnection between the two sides of the substrate having disposed thereon the signal conditioning circuitry.

Lastly, it is yet another object of the present invention to provide a pressure sensor assembly which is suitable for use in automotive applications and manufacturable by automotive production techniques.

In accordance with a preferred embodiment of this invention, these and other objects and advantages are accomplished as follows.

A pressure sensor assembly is provided which solves the shortcomings of the prior art by providing a substrate having signal conditioning circuitry disposed on opposite surfaces of a supporting substrate, with the critical pressure sensing element disposed on one of these surfaces and the laser trimmable resistors disposed on the other surface of the substrate. A separate housing for the critical pressure sensing element is not required, since the preferred housing of this invention seals the side of the substrate containing the pressure sensing element thereby forming a pressurizable chamber, yet with the preferred housing, the resistors disposed on the opposite side of the substrate remain exposed for laser trimming during calibration.

The preferred housing has a circumferential ledge, on which the supporting substrate rests. This ledge spaces the substrate up from the bottom surface of the housing, thereby forming an air-tight chamber below the substrate for the pressure sensing element. A port is introduced into the chamber within a wall of the housing for pressurization of the chamber. In addition, when the substrate is attached to the circumferential ledge of the preferred housing for sealing the pressure sensing element, the through-holes, which electrically interconnect the signal processing circuitry on both of the substrates, are also concurrently sealed, since the through-holes are preferentially disposed along the perimeter of the substrate so as to contact the circumferential ledge within the preferred housing.

Therefore, when the substrate is mounted to the circumferential ledge within the preferred housing, the through-holes are sealed and a pressure chamber is concurrently formed. After final calibration and laser trimming of the exposed resistors provided on the opposite surface of the substrate, a cover is attached to seal the exposed signal conditioning circuitry.

A significant advantage of this invention is that the signal-processing circuitry remains accessible until the final passivation treatment is applied to the assembly. Where thick film circuitry is utilized, such an advantage allows for final trimming of the resistors in the circuit for the purpose of correcting any signal output errors resulting from processing tolerances of the circuit and the pressure sensing element. In addition, the design of this assembly efficiently provides for opposite surfaces of the supporting substrate to be populated by signal conditioning circuitry, therefore reducing the size of the substrate required and accordingly the size of the entire device. Also, a separate housing for the critical pressure sensing element is not required since the pressure sensing side of the substrate is sealed air tight while the other side of the substrate remains exposed for calibration, thereby minimizing the number of components and joints within the assembly. In addition, extra processing steps are not required for sealing the electrical interconnection through-holes which electrically connect the circuitry disposed on both surfaces of the substrate. Lastly, the design of this invention provides a small compact assembly which is amenable to automotive production techniques.

Other objects and advantages of this invention will be better appreciated from the detailed description thereof, which follows.

BRIEF DESCRIPTION OF THE DRAWINGS

The above and other advantages of this invention will become more apparent from the following description taken in conjunction with the accompanying drawings wherein.

DETAILED DESCRIPTION OF THE PREFERRED EMBODIMENTS

Figure 1:
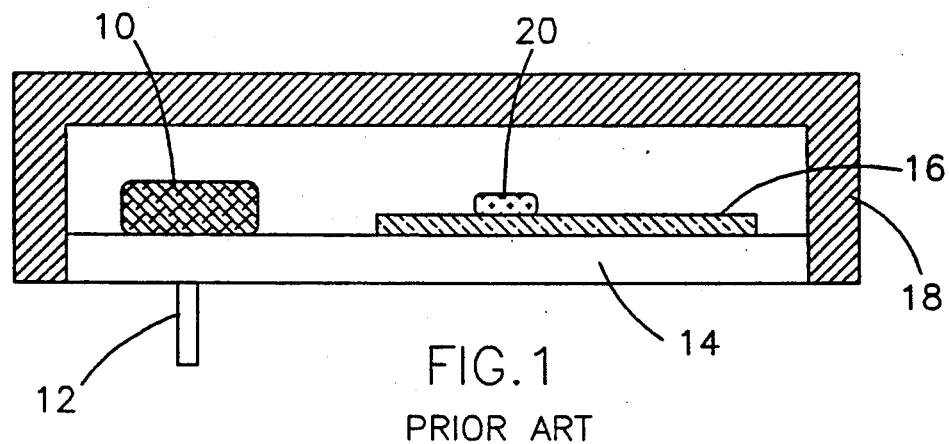
FIGS. 1 through 3 are cross-sectional side views of the construction and arrangement of prior art pressure sensors assemblies.
Figure 2:
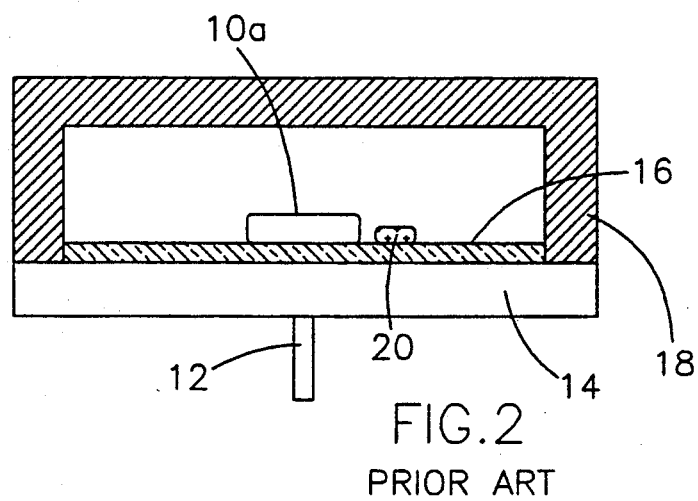
Figure 3:
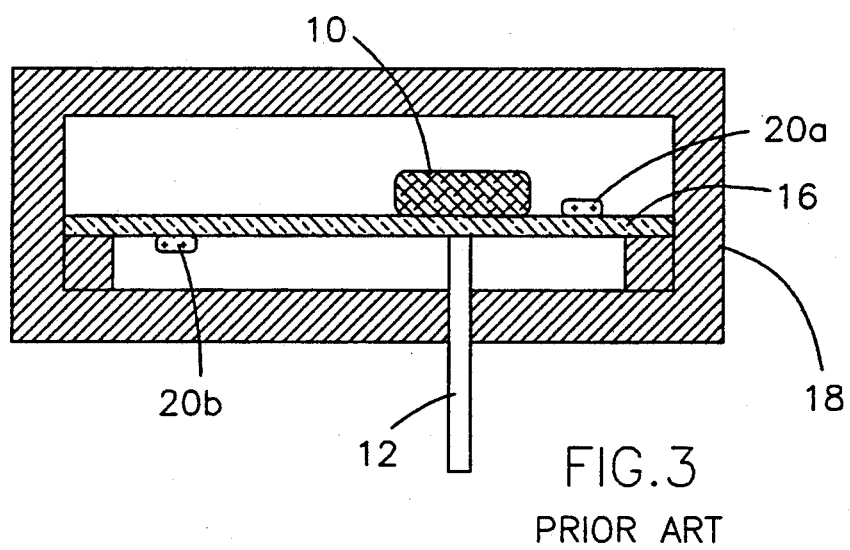

As shown in FIGS. 4 through 7 (which are exaggerated for purposes of better describing the teachings and advantages of this invention), a pressure sensor assembly is provided which contains a substrate 116 having signal conditioning circuitry disposed on opposite surfaces 134 and 136 of the substrate 116, with the critical pressure sensing integrated circuit 110 disposed on the bottom surface 134 of the substrate 116 and signal conditioning circuitry containing at least one resistor 120 disposed on the top surface 136 of the substrate 116 which can be trimmed during calibration by laser trimming operations. The preferred housing 118 seals the bottom side 134 of the substrate 116 containing the pressure sensing chip 110 thereby forming a pressurizable chamber 138, while keeping the resistor 120 on the top surface 136 exposed for subsequent trimming operations. In addition, when the bottom surface 134 of the substrate 116 is mounted to a circumferential ledge 128 of the preferred housing 118 for formation of the pressure chamber 138, the through-holes 122 which electrically interconnect the circuitry provided on the two surfaces 134 and 136 are concurrently sealed also.

Figure 4:
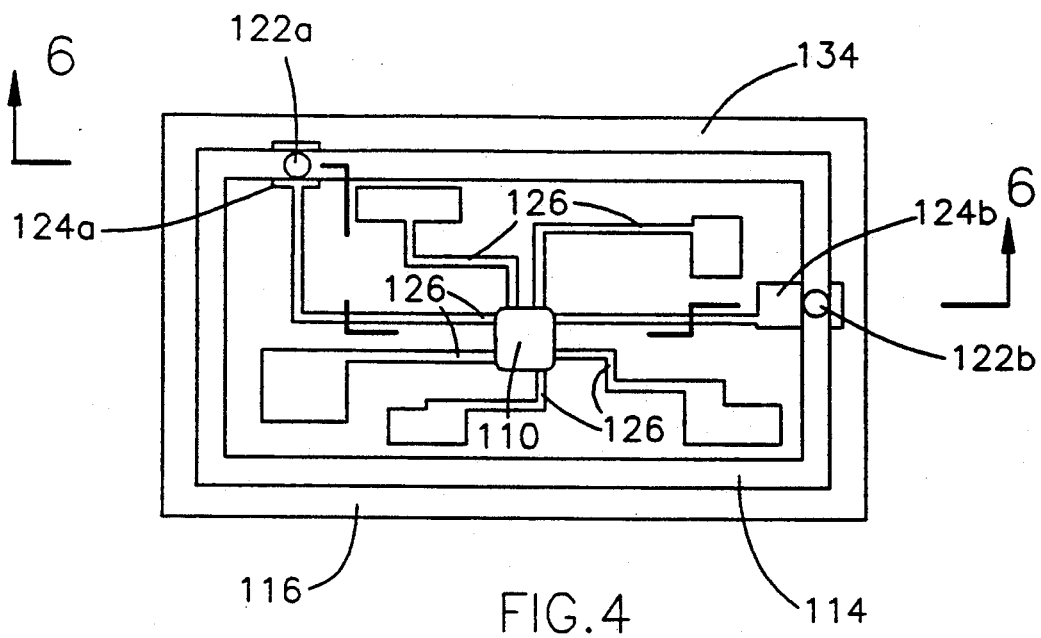
FIG. 4 is a cross-sectional bottom view of the pressure sensor assembly in accordance with a preferred embodiment of this invention showing the pressure sensing element and associated signal processing circuitry.

With specific reference to FIG. 4, a pressure sensing chip 110 is disposed on the bottom surface 134 of substrate 116. The pressure sensing chip 110 preferably consists of a piezoresistive silicon element which is integrated with adjusting circuitry in a monolithic silicon integrated circuit. The piezoresistive silicon element typically contains a diaphragm and piezoresistive strain sensors disposed on the diaphragm, which are connected to the adjusting circuitry for measuring the deflection of the diaphragm arising from pressure differentials across the diaphragm, although any other suitable means for sensing pressure changes could be employed instead of this type of pressure sensing integrated circuit 110.

The pressure sensing circuit 110 is bonded to the top of a rectangle (or other shape corresponding to the bottom surface of pressure sensing circuit 110) of conventional type pyrex glass known in the art. A layer of a suitable bonding agent is deposited evenly onto the bottom surface 134 of the substrate 116 at that region where the sensing element 110 is to be attached. The bonding agent ensures uniform adhesion between the components. A preferred bonding agent might be a silicone adhesive, such as Dow Corning 6611 silicone compound. Tis compound is a high purity silicone with the additional advantage of avoiding ionic contamination of the sensitive electronic circuitry.

The bottom of the pyrex type glass is attached to the bottom surface 134 of the substrate 116 by means of a suitable bonding agent, such as the silicone adhesive. The pyrex glass layer provides an even transition between coefficients of thermal expansion for the various materials while the silicone adhesive serves to absorb any undesirable stresses during use which could be transmitted directly to the sensing chip 110 if it were mounted directly to the substrate 116.

Additional associated, thick film signal processing circuitry, represented by electrically conductive runners 126, is deposited on the bottom surface 134 of the alumina substrate 116 and electrically connected to pressure sensing integrated circuit 110. The pattern of the runners 126 is merely illustrative and probably does not represent the actual pattern employed in a pressure sensor of this type, since the actual pattern would depend on the specific application for the pressure sensor.

The thick film signal conditioning circuitry represented by runners 126 on the bottom surface 134 are in electrical communication by means of through-holes 122 with the thick film signal conditioning circuitry provided on the top surface 136 of the substrate 116, represented by electrically conductive runners 130 in FIG. 5, and discussed more fully later. The electrically conductive runners 126 and 130 allow the input power and output signal to be transmitted to and from the pressure sensor chip 110 for signal conditioning and processing. The conditioned output signal is thereafter transmitted from the thick film circuitry 126 and 130 to the associated vehicle control system by means of external electrical connections (not shown), which are known in the art.

The thick film circuitry 126 and 130 is deposited onto the respective surfaces 134 and 136 of the alumina substrate 116 using conventional means such as silk screening techniques, although other techniques could also be used. The thick film circuitry 126 and 130 can be any electrically conductive material, such as copper, nickel, palladium or silver or others, as well as electrically conductive alloys of these materials. A preferred composition for the thick film circuitry 126 and 130 is a conventional palladium-silver alloy because of its good conductivity and the expertise at which such a material is deposited.

As stated previously, electrically conductive through-holes 122a and 122b (shown in FIGS. 4 and 5) are interconnection vias between the two surfaces 134 and 136 of the substrate 116 for electrically connecting the thick film circuitry 126 and 130 on both surfaces 134 and 136 of the substrate 116. The interior, cylindrical surface of the electrically conductive through-holes 122 is coated with an electrically conductive material such as a conventional palladium-silver alloy, but may include any of those materials listed above for formation of the thick film circuitry. The actual number of through-holes 122 may vary depending on the specific application. Two through-holes 122a and 122b were shown for purposes of describing the teachings and advantages of this invention, although it is reasonable to expect that there could be a large plurality of through-holes in a particular embodiment.

Figure 5:
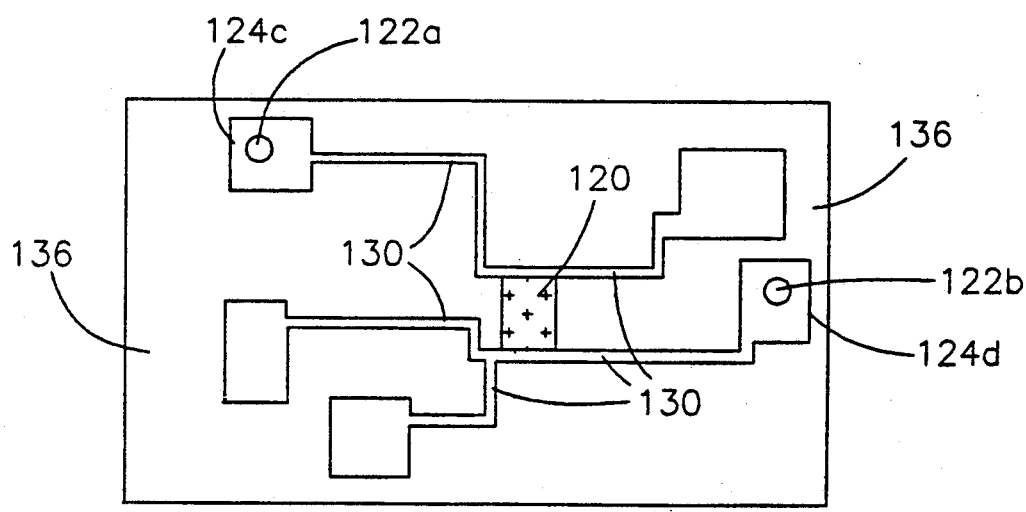
FIG. 5 is a cross-sectional top view of the pressure sensor assembly of FIG. 4 showing the signal processing circuitry which can be laser trimmed during calibration.

The through-holes 122a and 122b contact bond pads 124a and 124b respectively, as shown in FIG. 4, on the bottom surface 134 of the substrate 116 and contact bond pads 124c and 124d respectively on the top surface 136, as shown in FIG. 5. The bond pads 124 are formed from the same electrically conductive material employed for formation of the thick film circuitry 126 so as to ensure intimate and continuous contact between the bond pad 124 and the through-hole 122. Although the bond pads 124 do not need to be formed from the same electrically conductive material which is used for formation of the thick film circuitry 126 and 130, it is practical and efficient to use the same material on a single surface of the substrate 116 so as to minimize processing steps. The uniform and continuous contact between the through-holes 122 and bond pads 124 ensure continuous electrical connection between the thick film signal conditioning circuits 126 and 130 provided on both surfaces 134 and 136 of the substrate 116.

An advantage of this invention is that both surfaces 134 and 136 of the substrate 116 are designed to be populated by the signal conditioning thick film circuitry 126 and 130. This preferred design minimizes the space required for the signal conditioning circuitry 126 and 130, thereby providing an efficient, compact pressure sensor package.

As shown most clearly in FIGS. 4 and 5, the through-holes 122 are purposely positioned along the perimeter of the substrate 116. The placement of the through-holes 122 along the perimeter readily enables the subsequent sealing and packaging of the pressure sensing integrated circuit 110, as discussed more fully later. In the preferred embodiment, regardless of the number of through-holes 122 employed, the through-holes 122 would all be positioned along the perimeter of the substrate 116. In addition, it is to be noted that the through-holes 122 may be useful for electromagnetic interference purposes, as well as for electrically interconnecting the signal conditioning circuitry 126 and 130. For electromagnetic protection, some or all of the through-holes 122 would contact an electrical ground instead of contacting the bond pads 124 associated with the signal conditioning circuitry 126 and 130.

FIG. 5 illustrates the top surface 136 of the substrate 116. A single resistor 120 is shown as part of the signal conditioning circuitry 130 for purposes of disclosing the teachings and advantages of this invention. However, in practice, there may be a plurality of resistors provided within the signal conditioning circuitry 130. In addition, although not shown in FIG. 4, there may be resistors provided on the opposite, bottom surface 124 of the substrate 130 as well. However, they would not be accessible by laser trimming methods during calibration, as discussed more fully later. In addition, as stated previously with reference to FIG. 4, the exact pattern delineated by the thick film circuitry 130 is dependent on the particular application and well within the skills of a routineer in the art. The pattern depicted is merely illustrative of one possible embodiment. The resistor 120 is preferably a ruthenium thick film material deposited onto the surface 136 using conventional means such as silk screening.

Figure 6:
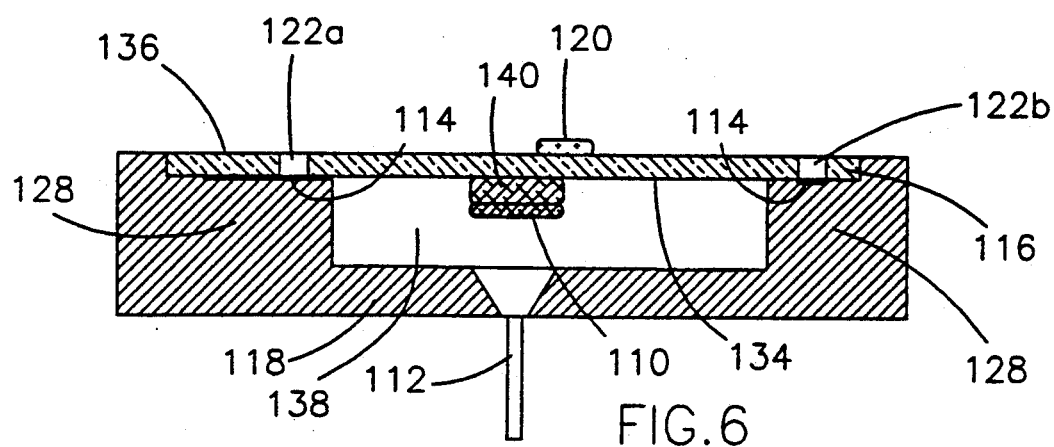
FIG. 6 is a cross-sectional side view of the pressure sensor assembly along line 6—6 of FIG. 4 showing the pressure chamber formed by the preferred and the sealed substrate.

As shown in FIG. 6, the bottom surface 134 (or pressure sensing side) of substrate 116 is enclosed within a ported housing 118. The ported housing 118 is preferably formed from a rigid light-weight material, such as Celanex 3300D, a 30% glass filled polyester commonly referred to throughout the industry as "PBT", although other suitable materials could also be employed.

The ported housing 118 contains an integral circumferential ledge 128 disposed around its circumference for concurrently sealing the through-holes 122 as it forms the pressure chamber 138. The pressure sensing integrated circuit 110 must be in a sealed pressure chamber 138 in order to calibrate the sensor and to operate properly. The perimeter of the bottom surface 134 of the substrate 116 is mounted to the circumferential ledge 128 of the housing 118 by suitable means, such as Dow Corning 6611 silicone adhesive, although other suitable materials could also be used. This adhesive region is represented by region 114 on the bottom surface 134 of the substrate 116 (also shown in FIG. 4.)

The through-holes 122, which electrically interconnect the signal processing circuitry 126 and 130 on both surfaces 134 and 136 of the substrate 116, and which are preferentially located around the perimeter of the substrate 116, also contact the circumferential ledge 128 of the ported housing 118 so as to be sealed concurrently with the formation of the pressure chamber 138. This concurrent sealing of the through-holes 122 ensures an air-tight pressure chamber 138 for the pressure sensing chip 110, and intimate adhesion between ported housing 118 on the bottom surface 134 and the substrate 116.

A port 112 is provided within the ported housing 118 for pressurizing the pressure sensing chamber 138. The pressure sensing chamber 138, which encloses the pressure sensing integrated circuit 110, is defined by the walls of the ported 118 and the bottom surface 134 of the substrate 116. The port 112 is preferably formed from a rigid molded plastic material but can be formed from any suitable material that can withstand pressurization. In addition, it may be desirable to provide a plurality of ports 112 within the ported housing 118 depending on the application.

It is to be noted that the pressure sensing integrated circuit 110 can be located anywhere on the bottom surface 134 of the substrate 116. It is advantageous that the pressure sensing chip 110 be placed near the center of the substrate 116 for minimization of stress due to the movement of the diaphragm, as shown. However, one must then take into account that the chip 110 will feel the effects of pressurization from the port 112 most fully, possibly causing other types of stresses, and therefore may want to position the pressure sensing chip 110 near but not at the center of the substrate 116. The various concerns of each particular application must be considered.

The assembly is now ready for testing and calibration. During this stage, test pressures are applied through the port 112 into the pressure sensing chamber 138 containing the pressure sensing chip 110 over a variety of temperatures. The signal conditioning circuitry 126 and 130 and resistor 120 on the top surface 136 of the substrate 116 are accordingly tested. If modification of the resistor 120 is required, a laser trims the necessary area from the resistor 120, therefore correspondingly adjusting its resistivity and its signal output. The use of laser trimming operations are known in the microelectronics art and so will not be described in further detail here.

It is to be recognized that this invention permits the testing and adjusting to be done without requiring that the entire package, probes or test equipment be enclosed in any special low pressure atmosphere. Moreover, the testing and adjusting does not require backside sense or optical access to the surface of the pressure sensing chip 110.

After testing and calibration, a high temperature vulcanizing silicone passivation gel (not shown), such as Dow Corning Q3-6635, is deposited into the chamber to protect the substrate 116 and overlaying circuitry 130 and components 120. Such a protective gel is very compliant for purposes of minimizing stresses due to thermal expansion and contraction of the gel in relation to the internal components of the pressure sensor assembly.

Figure 7:
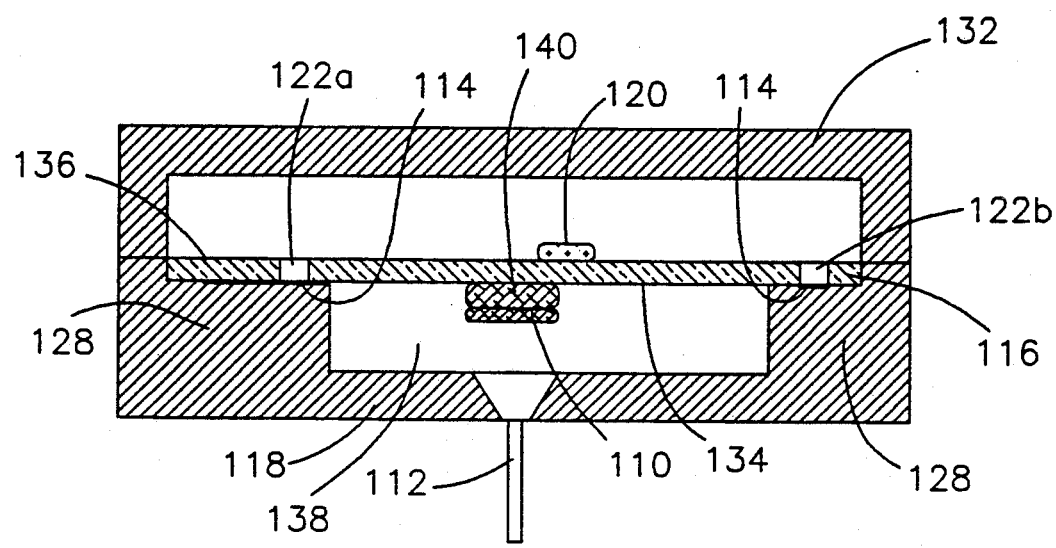
FIG. 7 is a cross-sectional side view of the finished pressure sensor assembly of FIG. 6.

As shown in FIG. 7, a top cover 132 is attached to the perimeter of the ported housing 118 to seal the exposed top surface 136 of the substrate 116 having the signal conditioning circuitry 130 and laser trimmed resistor 120. The top cover 132 is preferably formed from a rigid molded plastic material, such as the glass filled polyester employed to form the ported housing 118 or any suitable thermoplastic. The top cover 132 is attached to the ported housing 118 by any suitable means, such as by the use of an adhesive like Dow Corning 6611 silicone compound.

An air gap of approximately 1/16 of an inch is left between the cover and the silicone passivation gel to provide for thermal expansion and the like.

A significant advantage of the present invention as described above is that both the pressure sensing integrated circuit 110 and the hybrid thick film circuitry 126 and 130 are enclosed within a package in a manner which minimizes the package's weight and space requirements. This is accomplished by efficiently utilizing both sides of the substrate 116 for population by the circuitry. Further, the pressure sensing integrated circuit 110 of this invention does not require a separate housing since the pressure sensing side of the substrate 116 is sealed air tight by the ported housing 118.

An additional advantage is that the through-holes 122 are sealed concurrently as the substrate 116 is mounted to the housing 118, therefore eliminating additional processing steps. This is accomplished with the use of the preferred ported housing 118 which has a circumferential ledge 128 on which the supporting substrate 116 is mounted, which also seals the preferentially located through-holes 122. This ledge 128 spaces the substrate 116 up from the bottom surface of the housing 116, thereby forming an air-tight pressure chamber 138 below the substrate 116 for the pressure sensing chip 110.

A further advantage is that the hybrid thick film circuitry remains accessible after being deposited onto the substrate 116 until the final passivation treatment is applied. Such an advantage allows for final trimming of the resistors 120 in the circuitry 130 for the purpose of correcting any signal output errors resulting from processing of the individual elements of both the circuitry 130 and the pressure sensing integrated circuit 110 due to tolerances and thermally or mechanically induced stresses.

Lastly, the design of this invention provides a small compact assembly which is amenable to automotive production techniques.

Therefore, while our invention has been described in terms of a preferred embodiment, it is apparent that other forms of the device could be adopted by one skilled in the art. By example, it is clear that these teachings could be used with modified or alternative materials, or with modified processing parameters. It is, therefore, readily observable that there are other parameters which can produce the pressure sensor assembly of this invention, including the specific processes used and the specific geometry of the ported housing and circuitry patterns, as well as the specific components employed. For example, the ported housing could be designed in such a manner so as to concurrently form a pressure chamber and seal the through-holes, even if the through-holes were not located along the perimeter of the substrate. Accordingly, the scope of our invention is to be limited only by the following claims.

The embodiments of this invention in which an exclusive property or privilege is claimed are defined as follows:

1. A pressure sensor comprising:
   a substrate of alumina having oppositely disposed first and second surfaces, and having thick film signal conditioning circuitry on said first surface, said thick film circuitry disposed on said first surface containing at least one resistor characterized by a resistance value which can be varied in response to a signal output by said signal conditioning circuitry;
   a silicon pressure sensing integrated circuit disposed on said second surface of said substrate, said pressure sensing integrated circuit having a semiconductor circuit means including a pressure sensitive element and associated circuitry for producing a pressure sensitive output signal;
   at least one electrically conductive through-hole for contact with and electrical connection of said thick film signal conditioning circuitry disposed on said first surface and associated circuitry disposed on said second surface; and
   a ported housing having a ledge, said second surface of said substrate being mounted to said ledge of said ported housing so as to form a pressurized chamber enclosing said silicon pressure sensing integrated circuit and so as to seal all of said at least one through-holes;
   effective to produce an operable pressure sensor having a pressurized chamber wherein said resistance value of said at least one resistor disposed on said first surface of said substrate may be adjusted in response to said signal output of said signal conditioning circuitry.

2. A pressure sensor as recited in claim 1 wherein all of said at least one electrically conductive through-holes are located adjacent the perimeter of said substrate and said ledge of said ported housing is located around its circumference.

3. A pressure sensor comprising:
   a substrate of alumina having oppositely disposed first and second surfaces, and having thick film signal conditioning circuitry on said first surface, said thick film circuitry on said first surface containing at least one resistor characterized by a resistance value which can be varied in response to a signal output by said signal conditioning circuitry;
   a silicon pressure sensing integrated circuit disposed on said second surface of said substrate, said pressure sensing integrated circuit having a semiconductor circuit means including a pressure sensitive element and associated circuitry for producing a pressure sensitive output signal;
   at least one electrically conductive through-hole for contact with and electrical connection of said thick film signal conditioning circuitry disposed on said first surface and said associated circuitry on said second surface, all of said at least one through-holes being located adjacent the perimeter of said substrate;
   a ported housing having a circumferential ledge, said second surface of said substrate being mounted to said circumferential ledge of said ported housing so as to form a pressurized chamber enclosing said silicon pressure sensing integrated circuit and so as to seal all of said at least one through-holes located adjacent the perimeter of said substrate; and
   a cover for enclosing said top surface of said substrate, wherein prior to enclosing said top surface, said resistance value of said at least one resistor disposed on said first surface of said substrate is adjusted in response to said signal output of said signal conditioning circuitry.

4. A method for manufacturing a pressure sensor comprising the following steps:

provIding a substrate of alumina having a first and second surface, said alumina substrate having a thick film signal conditioning circuit including at least one resistor of varying resistance value disposed on said first surface, and said substrate having a silicon pressure sensing integrated circuit disposed on said second surface, said pressure sensing integrated circuit having a semiconductor circuit means including a pressure sensitive element and associated circuitry for producing a pressure sensitive output signal, said substrate further having at least one electrically conductive through-hole for electrically interconnecting said circuits on said first and second surfaces; and enclosing said second surface of said substrate having disposed thereon said pressure sensing integrated circuit with a ported housing so as to form a pressurized chamber, wherein said step of enclosing concurrently seals all of said at least one electrically conductive through-holes.

5. A method for manufacturing a pressure sensor as recited in claim 4 wherein all of said electrically conductive through-holes are located adjacent the perimeter of said substrate.

6. A method for manufacturing a pressure sensor as recited in claim 4 further comprising the steps of pressurizing said pressurized chamber such that said pressure sensitive integrated circuit and said signal conditioning circuitry respond to form an output signal; and adjusting said output voltage of said at least one resistor disposed on said first surface in response to said output signal.

7. A method for manufacturing a pressure sensor as recited in claim 4 further comprising a step of enclosing said first surface of said substrate after said adjusting step.

8. A method for manufacturing a pressure sensor comprising the following steps:

providing a substrate of alumina having a first and second surface, said alumina substrate having a thick film signal conditioning circuit including at least one resistor of varying resistance value disposed on said first surface, and said substrate having a silicon pressure sensing integrated circuit disposed on said second surface, said pressure sensing integrated circuit having a semiconductor circuit means including a pressure sensitive element and associated circuitry for producing a pressure sensitive output signal, said substrate further having at least one electrically conductive through-hole for electrically interconnecting said circuits on said first and second surfaces, all of said at least one electrically conductive through-holes are located adjacent the perimeter of said substrate;

enclosing said first surface of said substrate with a ported housing so as to form a pressurized chamber, wherein said step of enclosing concurrently seals all of said at least one electrically conductive through-holes;

pressurizing said pressurized chamber such that said pressure sensitive integrated circuit and said signal conditioning circuitry respond to form an output signal;

adjusting said resistance value of said at least one resistor disposed on said first surface in response to said output signal; and enclosing said first surface of said substrate after said adjusting step so as to form an air-tight, operable pressure sensor.

9. A method for manufacturing a pressure sensor as recited in claim 8 further comprising the step of passivating said first surface of said substrate after said adjusting step and before said second enclosing step.

* * * * *